(12) United States Patent
Jost et al.

(10) Patent No.: US 12,160,413 B2
(45) Date of Patent: *Dec. 3, 2024

(54) PARAMETER EXCHANGE DURING EMERGENCY ACCESS USING EXTENSIBLE AUTHENTICATION PROTOCOL MESSAGING

(71) Applicant: Telefonaktiebolaget LM Ericsson (publ), Stockholm (SE)

(72) Inventors: Christine Jost, Lund (SE); Vesa Lehtovirta, Espoo (FI); Ivo Sedlacek, Hovorcovice (CZ); Vesa Torvinen, Sauvo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/150,297

(22) Filed: Jan. 5, 2023

(65) Prior Publication Data

US 2023/0275883 A1    Aug. 31, 2023

Related U.S. Application Data

(63) Continuation of application No. 16/482,013, filed as application No. PCT/EP2018/052065 on Jan. 29, 2018, now Pat. No. 11,595,370.

(Continued)

(51) Int. Cl.
*H04L 9/40* (2022.01)
*H04W 12/0433* (2021.01)
(Continued)

(52) U.S. Cl.
CPC .......... *H04L 63/08* (2013.01); *H04L 63/0884* (2013.01); *H04L 63/0892* (2013.01);
(Continued)

(58) Field of Classification Search
CPC . H04L 63/08; H04L 63/0884; H04L 63/0892; H04W 12/72; H04W 12/0433; H04W 12/71; H04W 12/069; H04W 48/16
(Continued)

(56) References Cited

U.S. PATENT DOCUMENTS 7,683,773 B1 * 3/2010 Goodall ............... G06Q 10/087
705/13
8,526,408 B2    9/2013 Zhang et al.
(Continued)

FOREIGN PATENT DOCUMENTS

CN    101500214 B  *  7/2011
EP    3336711 B1  *  6/2019
(Continued)

OTHER PUBLICATIONS

Written Opinion in PCT/EP2018/052065 dated Dec. 21, 2018, 5 pages.
(Continued)

*Primary Examiner* — Haresh N Patel
(74) *Attorney, Agent, or Firm* — Rothwell, Figg, Ernst & Manbeck, P.C.

(57) ABSTRACT

Enabling the exchange of connection parameters where a user equipment (UE) lacks a secret shared with the network (e.g. a server), such as key materials, and lacks a valid certificate. In some embodiments, the connection parameters may be exchanged via EAP messages. In certain aspects, and particularly with respect to emergency attach, a simplified protocol is used with limited overhead because the UE does not attempt to authenticate the network, and the network does not attempt to authenticate the UE.

16 Claims, 14 Drawing Sheets

Related U.S. Application Data

(60) Provisional application No. 62/451,883, filed on Jan. 30, 2017.

(51) Int. Cl.
*H04W 12/069* (2021.01)
*H04W 12/71* (2021.01)
*H04W 12/72* (2021.01)
*H04W 48/16* (2009.01)
*H04W 84/12* (2009.01)

(52) U.S. Cl.
CPC ..... *H04W 12/0433* (2021.01); *H04W 12/069* (2021.01); *H04W 12/71* (2021.01); *H04W 12/72* (2021.01); *H04W 48/16* (2013.01); *H04W 84/12* (2013.01)

(58) Field of Classification Search
USPC ......................................................... 713/171
See application file for complete search history.

(56) References Cited

U.S. PATENT DOCUMENTS

| | | | |
|---|---|---|---|
| 2007/0263875 A1* | 11/2007 | Kitaya | H04L 9/0836 380/279 |
| 2008/0028211 A1* | 1/2008 | Tanizawa | H04L 63/065 713/163 |
| 2009/0043681 A1* | 2/2009 | Shoji | G06F 21/43 726/17 |
| 2010/0255808 A1* | 10/2010 | Guo | H04W 76/50 455/404.1 |
| 2010/0297979 A1 | 11/2010 | Watfa et al. | |
| 2011/0194553 A1 | 8/2011 | Sahin et al. | |
| 2012/0094629 A1* | 4/2012 | Liu | H04W 36/06 455/435.1 |
| 2012/0134286 A1* | 5/2012 | Bhalla | H04W 8/18 370/252 |
| 2012/0210392 A1* | 8/2012 | Zhou | H04W 12/06 726/4 |
| 2013/0051303 A1* | 2/2013 | Huang | H04W 8/26 370/312 |
| 2013/0121322 A1* | 5/2013 | Salkintzis | H04W 76/12 370/328 |
| 2013/0223421 A1* | 8/2013 | Gundavelli | H04W 76/12 370/338 |
| 2014/0050320 A1* | 2/2014 | Choyi | H04W 12/06 380/270 |
| 2014/0351592 A1* | 11/2014 | Starsinic | H04W 12/0431 713/168 |
| 2015/0271745 A1* | 9/2015 | Knowles | H04W 8/24 370/254 |
| 2015/0334766 A1* | 11/2015 | Lee | H04W 84/042 455/552.1 |
| 2016/0134610 A1* | 5/2016 | Lee | H04L 63/0414 726/7 |
| 2016/0182499 A1* | 6/2016 | Sharaga | G06F 21/82 713/156 |
| 2016/0183156 A1* | 6/2016 | Chin | H04W 36/38 370/331 |
| 2016/0183313 A1* | 6/2016 | Vallabhu | H04W 76/12 370/329 |
| 2016/0242033 A1* | 8/2016 | Jung | H04W 12/069 |
| 2016/0285627 A1* | 9/2016 | Sedlacek | H04L 43/0817 |
| 2016/0295385 A1* | 10/2016 | Wang | H04W 36/14 |
| 2016/0295386 A1* | 10/2016 | Faccin | H04W 4/029 |
| 2016/0295405 A1* | 10/2016 | Roeland | H04L 63/0281 |
| 2017/0156043 A1* | 6/2017 | Li | H04W 76/11 |
| 2017/0164200 A1* | 6/2017 | Näslund | H04W 12/069 |
| 2017/0264606 A1* | 9/2017 | Forssell | H04L 63/0281 |
| 2018/0152939 A1* | 5/2018 | Lee | H04W 72/542 |
| 2018/0295659 A1* | 10/2018 | Shan | H04W 4/24 |
| 2018/0317087 A1* | 11/2018 | Drevon | H04W 12/062 |
| 2018/0332457 A1* | 11/2018 | Thiebaut | H04W 12/041 |
| 2019/0036924 A1* | 1/2019 | Wang | H04W 76/10 |
| 2019/0230508 A1* | 7/2019 | Olsson | H04W 4/90 |
| 2019/0342940 A1* | 11/2019 | Ryu | H04W 4/90 |
| 2020/0008055 A1* | 1/2020 | Jost | H04W 12/71 |

FOREIGN PATENT DOCUMENTS

| | | | | |
|---|---|---|---|---|
| JP | 2010518719 A | | 5/2010 | |
| JP | 2018537927 A | * | 12/2018 | |
| KR | 101589574 B1 | * | 1/2011 | |
| VN | 10030329 B | * | 12/2021 | |
| WO | 2008095918 A1 | | 8/2008 | |
| WO | WO-2013104247 A1 | * | 7/2013 | ............ H04W 12/00 |
| WO | WO-2014107358 A1 | * | 7/2014 | |
| WO | WO-2017053742 A1 | * | 3/2017 | |
| WO | WO-2017129089 A1 | * | 8/2017 | |

OTHER PUBLICATIONS

Arkko, J., and Haverinen, H., "Extensible authentication protocol method for 3rd generation authentication and key agreement (EAP-AKA)," Network Working Group, The Internet Society, Jan. 2006, 79 pages.

Arkko, J., et al., "Improved extensible authentication protocol method for 3rd generation authentication and key agreement (EAP-AKA)," Network Working Group, IETF Trust, May 2009, 29 pages.

"3rd generation partnership project; Technical specification group services and system aspects; 3GPP system architecture evolution (SAE); security aspects of non-3GPP accesses (Release 14)," 3GPP TS 33.402, V14.0.0, Dec. 2016, 68 pages.

"3rd generation partnership project; Technical specification group core network and terminals; access to the 3GPP evolved packet core (EPC) via non-3GPP access networks; stage 3 (Release 14)," 3GPP TS 24.302, V14.2.0, Dec. 2016, 137 pages.

Aboba, B., et al., "Extensible authentication protocol (EAP)," Network Working Group, The Internet Society, Jun. 2004, 67 pages.

3rd Generation Partnership Project; Technical Specification Group Services and System Aspects; Architecture Enhancements for non-3GPP acesses (Release 14); 3GPP TS 23.402 V14.2.0., Dec. 2016, 307 pages.

\* cited by examiner

```
        0                   1                   2                   3
        0 1 2 3 4 5 6 7 8 9 0 1 2 3 4 5 6 7 8 9 0 1 2 3 4 5 6 7 8 9 0 1
       +-+-+-+-+-+-+-+-+-+-+-+-+-+-+-+-+-+-+-+-+-+-+-+-+-+-+-+-+-+-+-+-+
602    |     Code      |  Identifier   |            Length             |
       +-+-+-+-+-+-+-+-+-+-+-+-+-+-+-+-+-+-+-+-+-+-+-+-+-+-+-+-+-+-+-+-+
       |     Type      |  Type-Data ...
       +-+-+-+-+-+-+-+-+-+-+-+-+-+-+-+-+-+-+-+-+-+-+-+
```

600

```
        0                   1                   2                   3
        0 1 2 3 4 5 6 7 8 9 0 1 2 3 4 5 6 7 8 9 0 1 2 3 4 5 6 7 8 9 0 1
       +-+-+-+-+-+-+-+-+-+-+-+-+-+-+-+-+-+-+-+-+-+-+-+-+-+-+-+-+-+-+-+-+
       |     Type      |                Vendor-Id                      |
604    +-+-+-+-+-+-+-+-+-+-+-+-+-+-+-+-+-+-+-+-+-+-+-+-+-+-+-+-+-+-+-+-+
       |                       Vendor-Type                             |
       +-+-+-+-+-+-+-+-+-+-+-+-+-+-+-+-+-+-+-+-+-+-+-+-+-+-+-+-+-+-+-+-+
       |                       Vendor data...
       +-+-+-+-+-+-+-+-+-+-+-+-+-+-+-+-+-+-+-+-+-+-+-+-+
```

910 — send, to a server from a user equipment UE, a first message indicating an emergency attach request 920 — receive a second message from the server in response to the first message, wherein the second message comprises one or more connection parameters 930 — generate a third message responsive to the second message, wherein the responsive message comprises one or more connection parameters 940 — transmit the third message to the server

FIG. 9

PARAMETER EXCHANGE DURING EMERGENCY ACCESS USING EXTENSIBLE AUTHENTICATION PROTOCOL MESSAGING

CROSS REFERENCE TO RELATED APPLICATION(S)

This application is a Continuation of U.S. application Ser. No. 16/482,013, filed on Jul. 30, 2019 (now U.S. Pat. No. 11,595,370), which is the 35 U.S.C. § 371 National Stage of International Patent Application No. PCT/EP2018/052065, filed Jan. 29, 2018, designating the United States and claiming priority to U.S. Provisional Application No. 62/451,883, filed on Jan. 30, 2017, which is incorporated by this reference.

TECHNICAL FIELD

Disclosed are embodiments for transmission and reception of messages and parameters in a communication network.

BACKGROUND

When a user equipment (UE) accesses a communication network, there may need to be one or more authentication protocols in place such that the device and the network (e.g., the UE and a server) can be mutually authenticated.

One authentication framework is the Extensible Authentication Protocol (EAP), which is defined in RFC 3748 and can be used as a base for numerous authentication processes. For instance, RFC 4187 describes an Extensible Authentication Protocol Method for $3^{rd}$ Generation Authentication and Key Agreement (EAP-AKA), while RFC 5448 describes an Improved Extensible Authentication Protocol Method for $3^{rd}$ Generation Authentication and Key Agreement (EAP-AKA') (collectively, "EAP-AKA(')"). EAP can be used, for example, to authenticate a UE via a wireless LAN (WLAN) access point (AP), and in particular, via a trusted WLAN AP (TWAN), as described in 3GPP TS 33.402 and 24.302.

In addition to authentication and key agreement parameters, the messages sent in accordance with an authentication protocol, such as an EAP-AKA(') exchange, can also carry connection parameters, such as those specified in TS 23.402 and 24.302. These connection parameters may include, for example, those needed for setup and connection following authentication. Specific security groups and mechanisms, and in particular relating to non-3GPP and ePDG access, are provided in TS 33.402.

Documents US 2010/297979 and US 2011/194553 disclose methods and apparatuses for processing emergency calls. Document WO 2008/095918 discloses using a temporary identification to authenticate a session with a subscriber terminal.

SUMMARY

For non-emergency access and for emergency access when a UE has a Universal Integrated Circuit Card (UICC) with an International Mobile Subscriber Identity (IMSI) known in the network, a UE can use EAP, for instance EAP-AKA(') over TWAN with extensions that allow for exchange of other parameters, e.g. connection parameters specified in TS 23.402 and TS 24.302. Such parameters may be needed, for instance, for the setup of a connection following the exchange. However, in some instances, for example an emergency access when a UE has a UICC with an IMSI unknown in the network, or when the UE does not have any UICC at all, the network cannot validly authenticate the UE as the UE lacks any secret shared with the network and/or a certificate. Thus, the exchange of connection parameters is not enabled. Accordingly, there remains a need for the exchange of connection parameters even without mutual authentication.

According to some embodiments, methods and devices are provided that enable the exchange of connection parameters where the UE lacks a secret shared with the network, e.g., key materials. In some embodiments, the connection parameters may be exchanged via EAP messages, including as part of an EAP-3GPP-LimitedService based access. In certain aspects, and particularly with respect to an emergency attach, a simplified protocol is used with limited overhead because the UE does not attempt to authenticate the network, and the network does not attempt to authenticate the UE with full EAP-AKA(') access authentication.

According to some embodiments, a method for exchanging connectivity parameters is provided. In certain aspects, the method may be applied in the instance of a UE performing an emergency attach. The method includes, for example, receiving, at a server, first message transmitted by the UE. The first message may indicate an emergency attach request. The server can respond to the first message by generating a second message, such as an emergency attach initiation message, and transmitting it to the UE. The second message may include, for instance, one or more connection parameters. These connection parameters may include, for example, an indication of the network capabilities (e.g., single or multi-connection mode). In some embodiments, the second message, includes an indication regarding an access point status for the UE (e.g., a trusted WLAN AP). In further embodiments, the method also includes the server receiving a third message in response to the second message, wherein the third message comprises one or more connection parameters from the UE. In response, the server may further generate and transmit a fourth message, such as an emergency attach notification message. According to some embodiments, the second message is generated and transmitted to the UE based at least in part on a determination that authentication of the UE cannot proceed. This may be based, for example, on the contents of the first message.

According to some embodiments, a method for exchanging connectivity parameters is provided. The method includes generating, at a server, an emergency attach identity message comprising a request for an IMEI of a UE. The method further includes the server transmitting the emergency attach identity message to the UE, and the server receiving a response to the emergency attach identity message from the UE. In certain aspects, the response comprises an IMEI value of the UE. The method may further include the server generating an emergency attach initiation message, where the emergency attach initiation message comprises an indication regarding an access point status for the UE, as well as one or more connection parameters. The method further includes the server transmitting the emergency attach initiation message to said UE and receiving, from the UE, a responsive emergency attach initiation message. In some aspects, the responsive initiation message comprises one or more connection parameters. In further embodiments, the method may also include the server generating an emergency attach notification message, where the emergency attach notification message comprises one or more connection parameters, and then transmitting the emergency attach notification message to the UE. The method may also include the server receiving from the UE a responsive emergency attach notification message.

According to some embodiments, a server is configured to perform the methods. In certain aspects, the server may include one or more processors and a memory. The memory may comprise instructions executable by the processor(s), whereby the server is configured to perform the methods.

According to some embodiments, new request and response messages are provided for the exchange of connection parameters between a server and UE. The messages may be, for example, EAP messages. In some embodiments, an emergency attach identity message, an emergency attach initiation message, and/or an emergency attach notification message are provided. Additionally, in some embodiments, a responsive identity request message, a response to emergency attach identity message, a response to emergency attach initiation message, and/or a response to emergency attach notification message are provided. In certain aspects, these messages enable the exchange of connection parameters in an emergency attach without mutual authentication between the server and UE. Additionally, the transmission of the connection parameters can occur before generation of keying materials (e.g., before generation of a Master Session Key (MSK)).

In some embodiments, a server for communicating with a UE is provided. The server may include, for example, a transmitting module and a receiving module. The transmitting module can be configured to transmit, from the server to the UE, one or more of an emergency attach identity message, an emergency attach initiation message, and an emergency attach notification message comprising one or more connection parameters. In certain aspects, the connection parameters are transmitted to the UE based at least in part on a determination that authentication of the UE cannot proceed. The receiving module can be configured to receive, at the server from the UE, one or more of a responsive identity request message, a response to emergency attach identity message, a response to emergency attach initiation message, and/or a response to emergency attach notification message comprising one or more connection parameters.

According to some embodiments, a server is provided. The server may be adapted to, for instance receive a responsive identity request message transmitted by a user equipment (UE), wherein said message indicates an emergency attach request, and respond to the message. In certain aspects, the step of responding to the message comprises generating a responsive message, where the responsive message comprises an indication regarding an access point status for the UE and one or more connection parameters, and transmitting to the message to the UE. The responsive message may be, for example, an emergency attach initiation message.

According to some embodiments, a method for exchanging connectivity parameters is provided. The method may include, for example, sending, to a server from a user equipment UE, a first message indicating an emergency attach request. The method may further include the UE receiving a second message from the server in response to the first message, such as an emergency attach initiation message, wherein the second message comprises one or more connection parameters. In certain aspects, the second message comprises an indication regarding an access point status for the UE, and the connection parameters indicate support for one or more connection modes. In some embodiments, the method further includes the UE generating a third message that is responsive to the second message, wherein the third message comprises one or more connection parameters and the UE transmits the third message to the server. The connection parameters may include, for example, one or more of information regarding a connection mode for said UE (e.g., regarding one of single-connection mode and multi-connection mode), requested PDN type (e.g., IPv4, IPv6, IPv4v6), and protocol configuration options. In some embodiments, the method is performed where the UE is not authenticated to the network. In some instance, the UE lacks a shared secret or certificate with the server.

According to some embodiments, a UE is configured to perform the method. The UE may include, for instance, one or more processors and a memory, where the memory comprises instructions executable by the processor(s) to perform the method. In some embodiments, the UE includes a receiving module and a transmitting module. In certain aspects, the receiving module is configured to receive, at the UE from the server, one or more of an emergency attach identity message, an emergency attach initiation message, and an emergency attach notification message comprising one or more connection parameters. Additionally, the transmitting module can be configured to transmit, from the UE to the server, one or more of a responsive identity request message, a response to emergency attach identity message, a response to emergency attach initiation message, and/or a response to emergency attach notification message comprising one or more connection parameters. This may occur, for instance, where the UE lacks a shared secret or certificate.

According to some embodiments, a UE is provided. The UE may be adapted to send, to a server, a responsive identity request message indicating an emergency attach request, and receive, from the server, a response to the message, wherein the response comprises one or more connection parameters and the UE lacks a shared secret or certificate with the server. The response may be, for instance, an emergency attach initiation message.

According to some embodiments, a computer program product comprising a non-transitory computer readable medium storing a computer program comprising instructions is provided. When executed on at least one processor, the instructions cause the at least one processor to receive a first message transmitted by a user equipment, UE, wherein said first message indicates an emergency attach request; determine, based at least in part on said first message, that an authentication of said UE cannot proceed; and respond to the first message, wherein responding to the first message comprises: generating a second message, wherein said second message comprises one or more connection parameters; and transmitting to the UE said second message.

According to some embodiments, a computer program product comprising a non-transitory computer readable medium storing a computer program comprising instructions is provided. When executed on at least one processor, the instructions cause the at least one processor to send, from a UE to a server, a first message indicating an emergency attach request; and receive a second message from the server in response to the first message, wherein said second message comprises one or more connection parameters and said UE lacks a shared secret or certificate with said server.

In certain aspects, connection parameters are exchanged in 3GPP EAP messages for unauthenticated emergency access.

BRIEF DESCRIPTION OF THE DRAWINGS

The accompanying drawings, which are incorporated herein and form part of the specification, illustrate various embodiments.

FIG. 6 is a diagram illustrating data structures and values.

FIG. 9 is a flow chart illustrating a process according to some embodiments.

DETAILED DESCRIPTION

Figure 1:
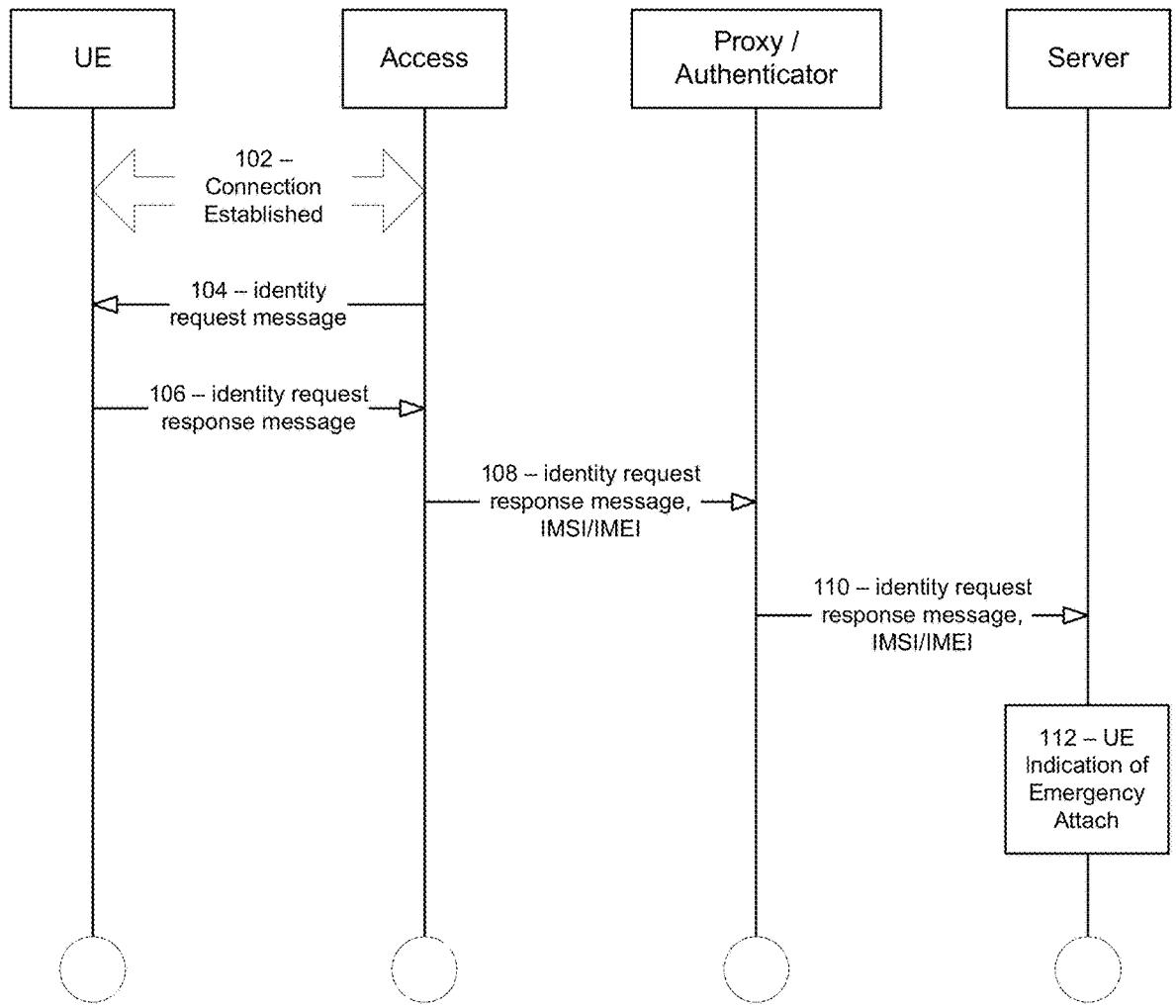
FIG. 1 is a signal diagram illustrating a process according to some embodiments.

According to some embodiments, methods and devices are provided that enable the exchange of connection parameters where the UE lacks a secret shared with the network, e.g., key materials, and lacks a valid certificate.

According to some embodiments, the connection parameters can include indications from a network, for example from a 3GPP Authentication, Authorization and Accounting (AAA) protocol server, regarding network capabilities. For instance, connection parameters may indicate support for a single-connection mode, multi-connection mode, transparent single-connection mode, and emergency services.

According to some embodiments, the connection parameters can include indications from a User Equipment (UE), regarding connection modes. For instance, a UE may indicate whether its wants to use a single-connection mode or a multi-connection mode. According to certain aspects, and with respect to the single-connection mode, the UE may indicate an emergency attach or an emergency handover, a requested Packet Data Network (PDN) type (e.g., IPv4, IPv6, IPv4v6), and/or protocol configuration options. The term PDN typically refers to a network for transmitting data, such as packet-switched network, and a PDN type may refer to the specific type of network or one or more protocols used to communicate over such a network. As to multi-connection mode, the UE may indicate an emergency attach or an emergency handover. In certain aspects, connection parameters may include those set forth in clauses 6.4.2.6.2 and 6.4.2.6.3 of TS 24.302 and 6.4.2.6.2A and 6.4.2.6.3A of TS 24.302. For example, connection parameters may include one or more of AT_TWAN_CONN_MODE, CONNECTION_CAPABILITY, CONNECTIVITY_TYPE, ATTACHMENT_TYPE, PROTOCOL_CONFIGURATION_OPTIONS, AT_RESULT_IND, SCM_RESPONSE, AT_NOTIFICATION, PROTOCOL_CONFIGURATION_OPTIONS, IPV4_ADDRESS, IPV6_INTERFACE_IDENTIFIER, TWAG_UP_MAC_ADDRESS, CONNECTION_MODE_CAPABILITY, SUPPORTED_WLCP_TRANSPORTS, MCM_REQUEST, AT_RESULT_IND, AUTHORIZATIONS, and TWAG_CP_ADDRESS, CAUSE.

Additionally, the network may provide responsive information. For example, with respect to a single-connection mode, the network may provide one or more of the PDN type supported in the Packet Data Network (PDN) connection (e.g., IPv4, IPv6, IPv4v6), protocol configuration options, IPv4 address and/or IPv6 interface identifier, and the trusted WLAN access gateway (TWAG) user plane MAC address. For example, with respect to multi-connection mode, and the network may provide one or more of the TWAG control plane MAC address(es). Connection parameters according to some embodiments are provided in TS 23.402 or TS 24.302. Such connection parameters may include, for instance, for a single-connection mode the PDN type supported in the PDN connection in the PDN_TYPE item and/or the protocol configuration options in the PROTOCOL_CONFIGURATION_OPTIONS item. Also, for example, with respect to multi-connection mode, the connection parameters may include the TWAG control plane address(es) in the TWAG_CP_ADDRESS item and or the WLCP key.

Referring now to FIG. 1, FIG. 1 is a signaling diagram that illustrates a message exchange 100 according to some embodiments. In this example, messages are communicated between a UE and server. The UE may be, for example, any kind of wireless device such as a mobile phone, cellular phone, Personal Digital Assistants, PDA, a smart phone, tablet, sensor equipped with wireless communication abilities, Laptop Mounted Equipment (LME), e.g. USB, Laptop Embedded Equipment (LEE), Machine Type Communication (MTC), device, Machine to Machine (M2M), device, cordless phone, e.g. DECT phone, or Customer Premises Equipment (CPEs), etc. The server may be, for example, a 3GPP Authentication, Authorization and Accounting (AAA) protocol server, including one or more intermediate authenticators and/or proxies, or similar modules. In certain aspects, the UE may access the network via an access point, and communications between the UE and server may go through one or more proxies or other intermediate devices or modules.

In step 102 of the signaling diagram, a connection is established between the UE and an access point. The access point could be, for instance, a non-3GPP access point, such as a wireless LAN access point. In some embodiments, the access point is a trusted Wireless LAN access point (TWAN). According to some embodiments, the access point could be an Evolved Packet Data Gateway (ePDG).

In step 104 of the signaling diagram, an identity request message is sent to the UE from the access network. The messages may be exchanged according to a protocol specific to the access network. According to some embodiments, the identity request message may be an EAP-Request/Identity message.

In step 106 of the signaling diagram, the UE sends an identity request response message to the access network. According to some embodiments, this message may be an EAP-Response/Identity message. The message may include, for example, one or more of an International Mobile Subscriber Identity (IMSI) and International Mobile station Equipment Identity (IMEI) number or value. In this example, the UE can send its identity complying with Network Access Identifier (NAI) format, for instance, as specified in TS 23.003. The NAI can contain either a pseudonym allocated to the UE in a previous run of an authentication procedure or, in the case of first authentication, the IMSI. In the case of first authentication, the NAI can indicate EAP-AKA(') as specified in TS 23.003. In some embodiments, for example if the UE does not include a UICC, the UE will send its identity complying with the Emergency NAI for Limited Service State format for IMEI, as specified in TS 23.003.

In step 108 of the signaling diagram, the access network, such as a TWAN access point, routes the responsive identity request message towards the proper server. For example, it may be routed to the proper 3GPP AAA server based on the realm part of the NAI. The routing path may also include one or more intermediate nodes and/or modules, include one or several AAA proxies. For instance, in step 110, the message may be routed from a proxy/authenticator. In some embodiments, the access type and the identity of the access network in which the proxy/authenticator resides, can be included. In the case of roaming, a visited network AAA proxy shall also include the visited network identifier in the same message.

According to certain aspects, the access network identity can be defined separately for each access network type. For instance, as documented in TS 24.302, to ensure that the UE and a Home Subscriber Server (HSS) use the same access network identities as input for key derivation. In certain aspects, diameter referral can also be applied to find a AAA server.

In step 112 of the signaling diagram, the server receives the message, which indicates an emergency attach by the UE. In some embodiments, the server, which may be a 3GPP AAA Server, receives the identity request response message, which contains the subscriber identity and the access type over an interface.

In some embodiments, the server receives the identity request response message with an indication from the UE that it is an Emergency Attach. In certain aspects, for example if the server supports IMS Emergency sessions over WLAN, it proceeds as follows:

When the received subscriber identity is an IMSI, but the IMSI authentication cannot proceed (e.g., because IMSI is not present in HSS or otherwise known to the server) or if the AAA server cannot determine if authentication is successful, and if local policies allow emergency sessions for unauthenticated UEs with an IMSI, the server will skip certain authentication procedures (e.g., EAP-AKA(') procedures) and proceed to obtain IMEI from the UE, and to provide indications to the UE as required. For instance, indications as set forth in 3GPP TS 23.402 and 24.302. According to some embodiments, the server determines that based on the IMSI, authentication (such as a EAP-AKA(') processes) cannot proceed as would be normal, and generates and sends a responsive message containing connection parameters to the UE.

In some embodiments, when the received subscriber identity is an IMEI, and if local policies allow emergency sessions for all UEs, the server can provide the indications required in 3GPP TS 23.402 and 24.302. According to some embodiments, this is done without generating and/or using keying materials, such as a Master Session Key (MSK).

Figure 2:
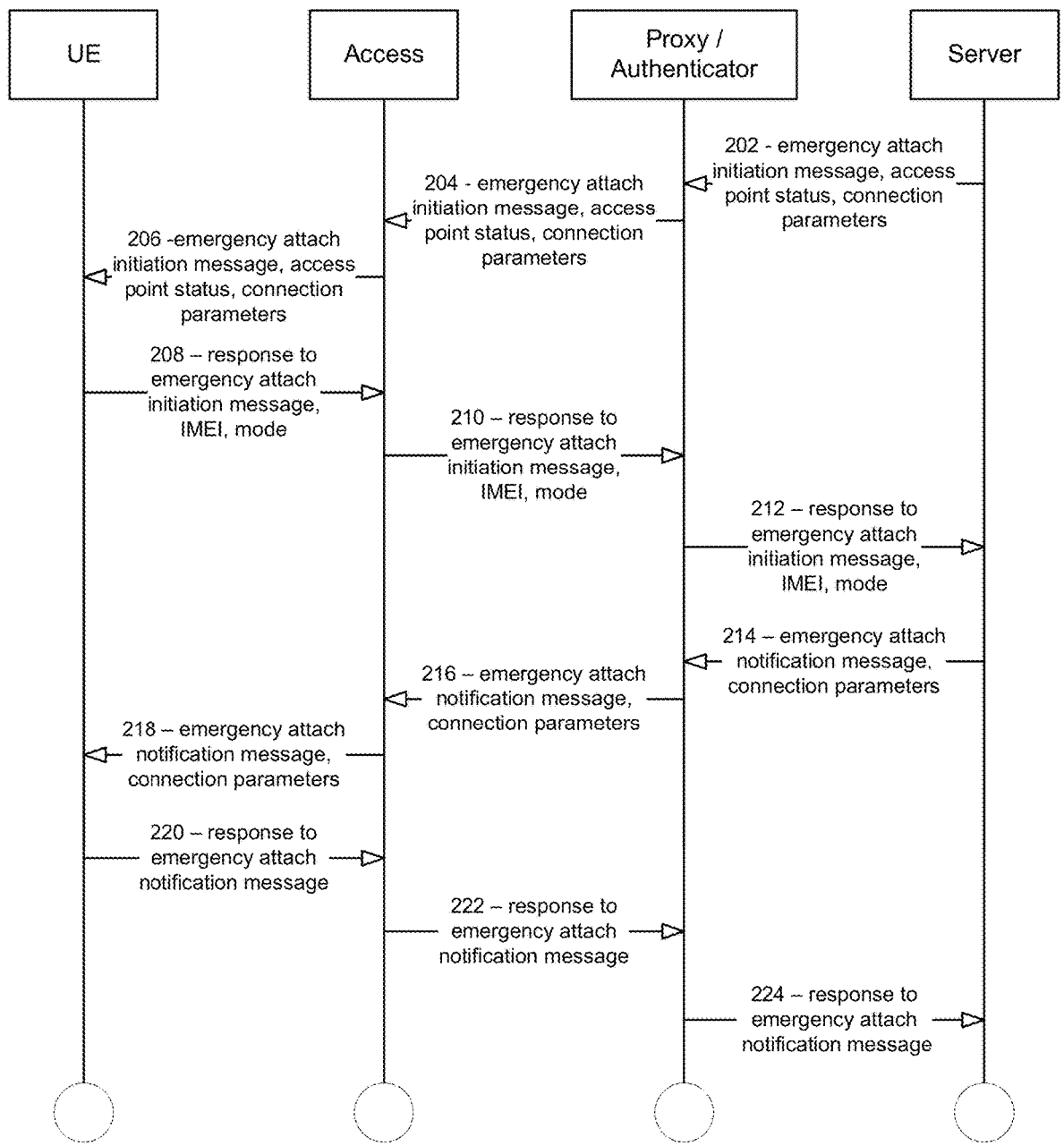
FIG. 2 is a signal diagram illustrating a process according to some embodiments.

Referring now to FIG. 2, FIG. 2 is a signaling diagram that illustrates a message exchange 200 according to some embodiments. The steps of exchange 200 may follow, for example, the steps of FIG. 1. For instance, the steps of exchange 200 may be in response to the receipt of the message of steps 110 and 112, and in response to determining that an authentication cannot proceed as described in the paragraph above.

In step 202, the server sends a message (e.g., an emergency attach initiation message). The message may be, for example, an EAP-Request/3GPP-LimitedService-Init-Info message, for instance, as used in TS 24.302. In some embodiments, the message includes one or more of access point status and connection parameters. According to some embodiments, the message provides an indication to the UE of the server's network capabilities, such as what connection modes (e.g. single or multi-connection mode) are supported. For instance, it may include one or more parameters set forth in TS 23.402 and 24.302. In certain aspects, the server, which can be a 3GPP AAA server, indicates in the message that the access point is a trusted WLAN access point. If an IMEI needs to be obtained, the server may further indicate a request for IMEI. For instance, an EAP-Request/3GPP-LimitedService-Init-Info message can contain a request for IMEI.

In steps 204 and 206, the message may be routed through one or more proxies/authenticators, including through the access network. The proxy/authenticator and access network may, for instance, forward an emergency attach initiation message to the UE.

In step 208, the UE receives the message (e.g., the emergency attach initiation message) and responds with a responsive message (e.g., a response to emergency attach initiation message), which it sends to the server. The responsive message may be, for example, an EAP-Response/3GPP-LimitedService-Init-Info message, for instance, as used in TS 24.302. In some embodiments, the UE may include connection parameters. The UE may respond, for instance, with information set forth in TS 23.402. For example, the responsive message may include information regarding a connection mode for the UE, e.g., regarding one of single-connection mode and multi-connection mode. If the message from the server indicates a request for IMEI, the responsive message may further include the UE's IMEI value. Thus, and in certain aspects, the identification of the connection mode and/or inclusion of an IMEI value is directly responsive to the contents of an emergency attach initiation message from the server.

In steps 210 and 212, the access network and proxies/authenticators forward the responsive message to the server.

In step 214, the server receives the message from the UE and sends another message (e.g., an emergency attach notification message). This message may be, for example, an EAP-Request/3GPP-LimitedService-Notif message, for instance, as used in TS 24.302. In some embodiments, if the first message (e.g., the emergency attach initiation message) included a request for IMEI, if the received responsive message does not include the IMEI value for the UE, the server may rejected the access request of the UE and the process 200 may stop. In certain aspects, an emergency attach notification message is transmitted and includes connection parameters, such as those set forth in TS 23.402 and TS. 24.302. For example, the connection parameters of the message may include a PDN type supported in a PDN connection (e.g., IPv4, IPv6, IPv4v6), protocol configuration options, IPv4 address and/or IPv6 interface identifier, and the trusted WLAN access gateway (TWAG) user plane MAC address. For example, with respect to multi-connection mode, the network may provide one or more of the TWAG control plane MAC address(es).

In steps 216 and 218, the message from the server is routed to the UE, for instance, through one or more of the proxies/authenticators and the access network.

In step 220, the UE receives the message from the server and sends a response (e.g., a response to emergency attach notification message). This message may be, for example, an EAP-Response/3GPP-LimitedService-Notif message, for instance, as used in TS 24.302. In steps 222 and 224, the message from the UE is routed through one or more of the access network and the proxies/authenticators.

Figure 3:
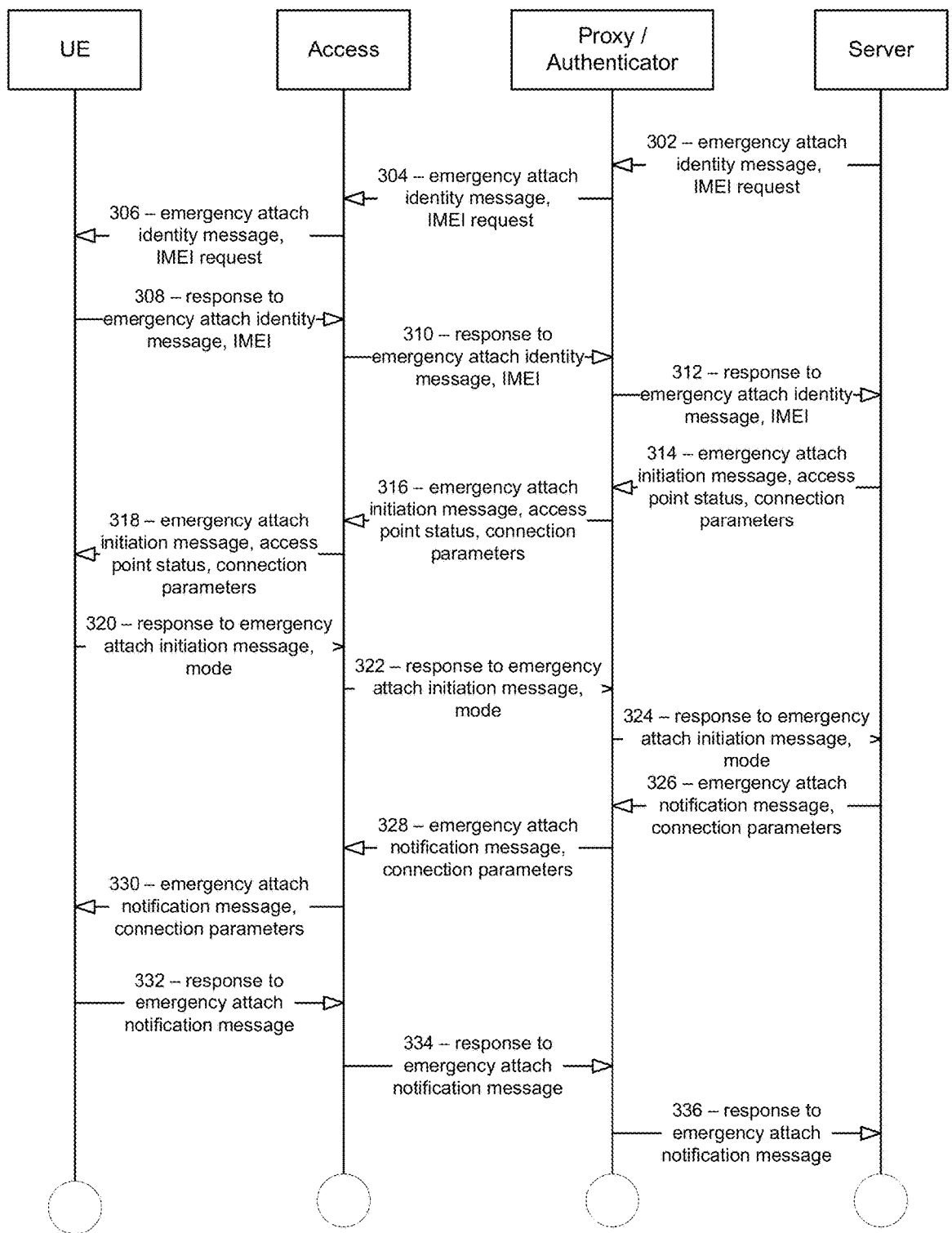
FIG. 3 is a signal diagram illustrating a process according to some embodiments.

Referring now to FIG. 3, FIG. 3 is a signaling diagram that illustrates a message exchange 300 according to some embodiments. The steps of exchange 300 may follow, for example, the steps of FIG. 1, such as steps 110 and 112. In some embodiments, the exchange 300 may be in response to steps 110 and 112. In certain aspects, the steps of exchange 300 may be performed as an alternative to the steps of FIG. 2.

In step 302, the server sends a request to the UE for its IMEI, for instance, as part of an emergency attach identity message. The server may be, for instance, a 3GPP AAA server.

In steps 304 and 306, the message is forward to the UE through one or more of proxies/authenticators and an access network. The access network may be, for example, a trusted WLAN Access Point (TWAN).

In step 308, the UE receives the message and prepares a response, such as a response to emergency attach identity message. The message can include, for instance, an IMEI value for the UE.

In steps 310 and 312, the message is forwarded to the server through one or more of the access network and proxies/authenticators.

In step 314, the server receives the response from the UE sends another message, such as an emergency attach initiation message. In some embodiments, the message includes one or more of access point status and connection parameters. For instance, it may include one or more parameters of TS 23.402 and 24.302. In certain aspects, the server, which can be a 3GPP AAA server, indicates in the message the access point is a trusted WLAN.

In steps 316 and 318, the message may be routed through one or more proxies/authenticators, including through the access network. The proxy/authenticator may, for instance, forward an emergency attach initiation message to the UE.

In step 320, the UE receives the message (e.g., the emergency attach initiation message) and responds with a message, such as a response to emergency attach initiation message, which is sent to the server. In some embodiments, the UE may include connection parameters. For example, the message may include information regarding a connection mode for the UE, e.g., regarding one of single-connection mode and multi-connection mode. The UE may respond, for instance, with information set forth in TS 23.402 and TS 24.302.

In steps 322 and 324, the access network and proxies/authenticators forward the responsive message (e.g., response to emergency attach initiation message) to the server.

In step 326, the server receives the response to emergency attach initiation message and sends another message, such as an emergency attach notification message, in response. In certain aspects, an emergency attach notification message is sent and includes connection parameters, such as those set forth in TS 23.402 and TS. 24.302.

In steps 328 and 330, the message from the server is routed to the UE, for instance, through one or more of the proxies/authenticators and the access network.

In step 332, the UE receives the message from the server and sends a response, such as a response to emergency attach notification message. In steps 334 and 336, the message is routed through one or more of the access network and the proxies/authenticators.

Figure 4:
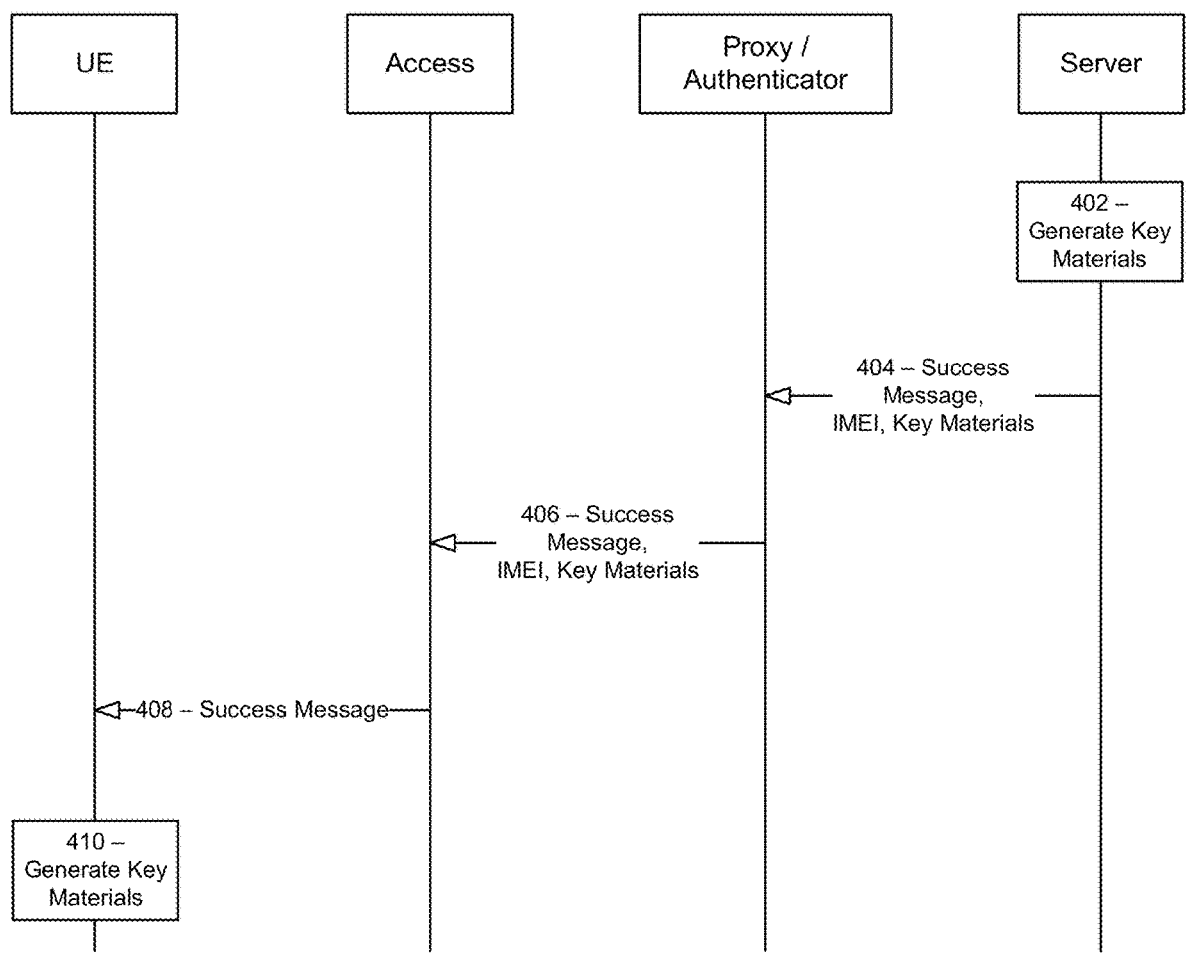
FIG. 4 is a signal diagram illustrating a process according to some embodiments.

Referring now to FIG. 4, FIG. 4 is a signaling diagram that illustrates a message exchange 400 according to some embodiments. The steps of exchange 400 may follow, for example, the steps of FIG. 2 or FIG. 3.

In step 402, the server generates key materials for authentication according to some embodiments. For example, the server may generate a Master Session Key (MSK) or Extended Master Session Key (EMSK). In certain aspects, the server may be a 3GPP AAA server.

In step 404, the server sends a success message. In some embodiments, the success message may be an Authentication and Authorization Answer, which can include EAP and the MSK key material. In certain aspects, the message may include a result code indicating success. In some embodiments, the message is forwarded to a proxy/authenticator. The message may include a Permanent User Identity IE, which contains the IMEI previously obtained from the UE.

In step 406, the message is forwarded to the access network. In some embodiments, an authenticator or the access network can store the keying material to be used in communication with the unauthenticated UE, as required by the access network.

In step 408, the message may be forwarded on to the UE, or the UE may be otherwise informed of an EAP success.

In step 410, the UE generates key materials, such as MSK. This may be based on the IMEI, for example. Accordingly, in some embodiments, the UE and authenticator in the access network share MSK keying material.

According to some embodiments, the MSK of steps 402 and 410 can be derived in accordance with clause A.4 of Annex A to TS 33.402, which provides:

"When deriving MSK for Unauthenticated Emergency sessions over WLAN, the following parameters shall be used to form the input S to the KDF.

FC=0x22,
P0="unauth-emer" (i.e. 0x75 0x6E 0x61 0x75 0x74 0x68 0x65 0x6D 0x65 0x72)
L0=length of P0 is 11 octets (i.e., 0x00 0x0B).

The input key shall be the IMEI of the UE."

According to some embodiments, all steps of FIG. 4 occur after the steps of FIGS. 1, 2, and/or 3 are completed. Accordingly, connectivity parameters are exchanged without server and UE verification. In certain aspects, the steps of FIG. 2 or 3 are executed, and the messages are exchanged, without the inclusion of any authentication-related data or instructions.

Figure 5:
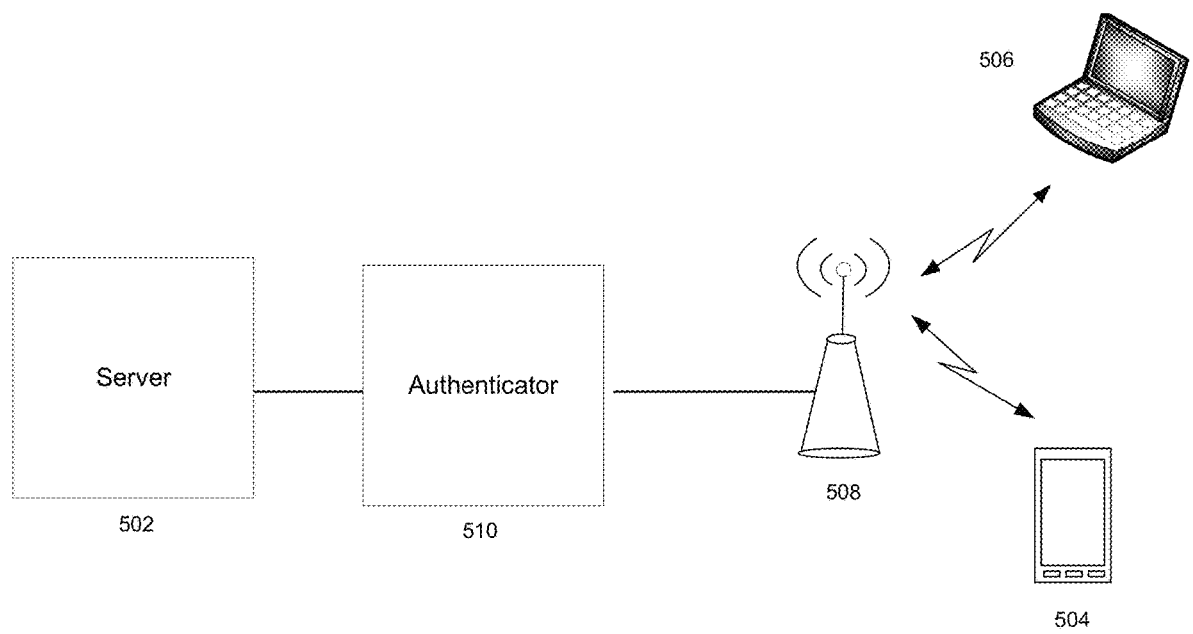
FIG. 5 is a network diagram according to some embodiments.

Referring now to FIG. 5, FIG. 5 is a network diagram 500 identifying a server 502, UEs 504, 506, an access point/network 508, and one or more proxies/authenticators 510, in communication with the access point/network 508 and server 502. In some embodiments, server 502 is a 3GPP AAA server. In certain aspects, an authenticator 510 or server 502 may reside, for instance, in a 3GPP Evolved Packet Core (EPC). In certain aspects, access between the server 502 and the UEs 504, 506 may include one or more non-3G access networks. Additionally, server 502 and/or authenticator 510 may be in connection with another subsystem (not shown), for example, a Home Subscriber Server (HSS) or Home Location Register (HLR). According to some embodiments, a tunnel end point in the network may be an Evolved Packet Data Gateway (ePDG), where the UE is configured to send EAP messages to the ePDG, which can in turn extract such messages and forward them to the 3GPP AAA server.

Referring now to FIG. 6, an illustration of message structures and values, including headers, in accordance with some embodiments is provided. In certain aspects, the messages according to certain embodiments, including response and request emergency attach initiation, emergency attach notification, and emergency attach identification, have a structure as set forth in message structure 602 and message structure 604. According to certain aspects, the "Code" field may be "1" for a request message sent from the server-side, and a "2" for a response message from the UE-side. In some embodiments, the "Type" may be a vendor-specific EAP message, for instance, as set forth at 604 and defined in RFC 3748 in clause 5.7 Expanded Types. The message may use value 254 for Expanded Type, and the Vendor-ID for 3GPP may be 10415.

According to some embodiments, the new messages may use 3GPP specific IDs in the Vendor-ID field of 604 and/or in a sub-field of the Vendor data field of 604. In certain aspects, the new messages may have a particular code identifying the new messages in the Vendor-Type field and/or a sub-field of the Vendor data field. In some embodiments, the same code point value can be used in the Vendor-Type field and a sub-field in the Vendor data field identifies the new messages. Additionally, the connection parameters of FIGS. 1-4 may be included in the Vendor data field. With this format for the new messages, for instance response and request emergency attach initiation, emergency attach notification, and emergency attach identification can be 3GPP EAP message for unauthenticated emergency access.

According to some embodiments, the parameters set forth in TS 23.402 and 24.302 may be encoded in the same way as for transport in EAP-AKA(') messages.

Figure 7:
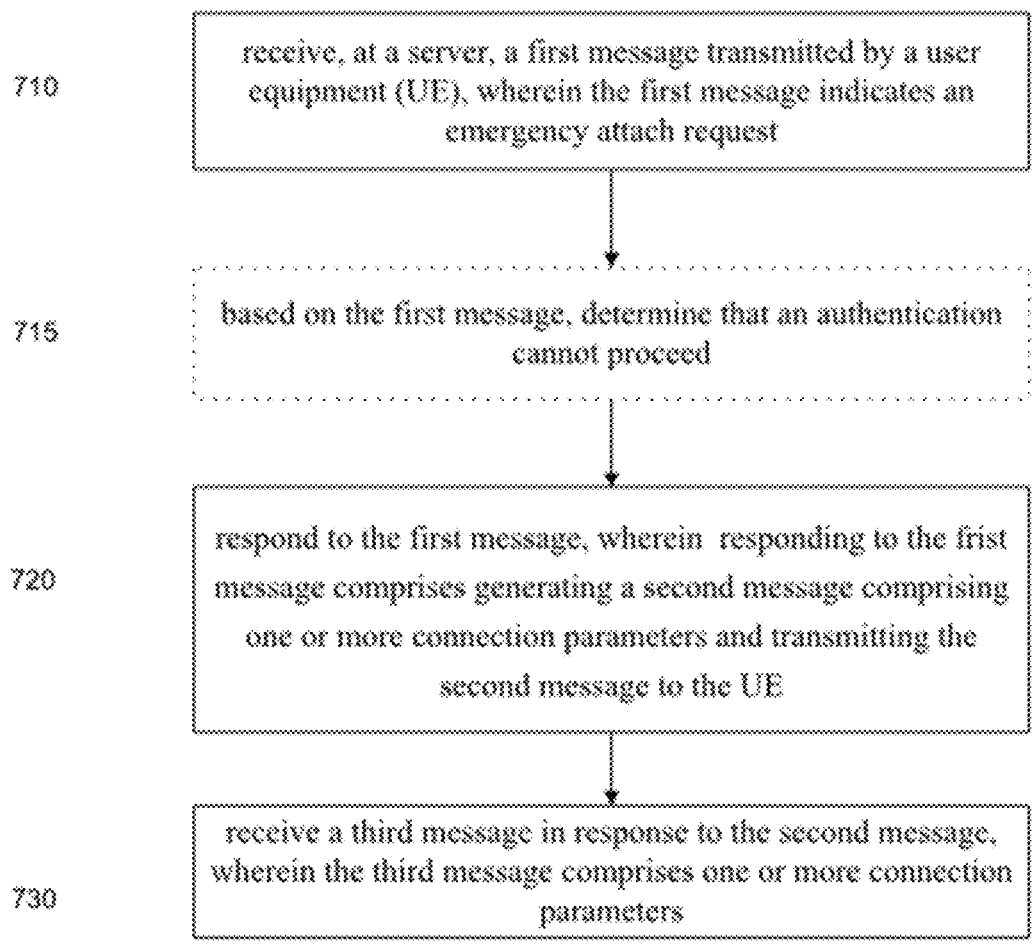
FIG. 7 is a flow chart illustrating a process according to some embodiments.

Referring now to FIG. 7, process 700 for exchanging connection parameters between a server and UE is provided in accordance with some embodiments. The server may be, for example, a 3GPP AAA server.

The process 700 may begin, for example, at step 710. In step 710, the server receives a first message from the UE, which indicates an emergency attach request. In some embodiments, the first message comprises an IMSI or IMEI value of the UE. For example, the first message may include an IMSI that is not known to the server, or indicate that the UE does not include a UICC. In some embodiments, the first message is a 3GPP EAP-Response/Identity message.

Referring now to step 715, which may be optional according to some embodiments, the server determines that an authentication cannot proceed, based at least in part on the received first message from the UE. For example, the server may determine that regular EAP authentication, including EAP-AKA(') authentication processes, cannot proceed. In certain aspects, this determination may be based at least in part on an IMSI and/or IMEI value received in the first message. For example, the server may determine that the received IMSI is not known to the server, or that the first message indicates that the UE does not include a UICC. In this instance, and according to some embodiments, the response of step 720 may be based on this determination.

In step 720, the server responds to the first message by generating a second message, such as an emergency attach initiation message, comprising one or more connection parameters, and then transmitting the second message to the UE. In some embodiments, the second message comprises an indication regarding an access point status for the UE. The indication regarding an access point status for the UE may indicate, for example, that the UE is accessing a network via a trusted Wireless LAN access point.

In some embodiments, for example where the IMSI is not known to the server, or there is an indication that the UE does not include a UICC, the message may include a request for an IMEI of the UE. The inclusion of this request may be based at least in part, in certain aspects, on the determination of step 715.

In step 730, the server receives a third message in response to the second message, wherein the response message from the UE comprises one or more connection parameters. In some embodiments, the response may comprise an IMEI value of the UE, which is based on the initial request from the server. This may be, for example, where an emergency attach initiation message indicates a request for an IMEI of the UE. Further, the connection parameters may indicate support for one or more connection modes, such as single-mode or multi-mode connection. The message may further include a requested PDN type (e.g., IPv4, IPv6, IPv4v6), and protocol configuration options.

According to some embodiments, the server may further generate a fourth message, such as an emergency attach notification message, which comprises one or more connection parameters. The server may also transmit to the UE the fourth message. In certain aspects, the connection parameters may include one or more of more of PDN type supported in a PDN connection (e.g., IPv4, IPv6, IPv4v6), protocol configuration options, IPv4 address and/or IPv6 interface identifier, a trusted WLAN access gateway (TWAG) user plane MAC address, and said TWAG control plane MAC address(es). The server may receive from the UE a fifth message (e.g., a response to emergency attach notification message) responding to the fourth message. In certain respects, messages between the UE and server may be exchanged via one or more proxies and/or authenticators in communication with the UE and server. The messages may be identifiable, for example, by one or more specific values in a Vendor-Type field of an EAP message header.

According to some embodiments, the steps of 700 occur without generation and/or use of a shared key with respect to the UE. In certain aspects, an exchange of key information may occur after step 730.

In some embodiments, the server receives an identity message, such as a responsive identify request from a second UE indicating an emergency attach request. The server may, in response, generate an additional message (e.g., an emergency attach initiation message for the second UE), wherein the message indicates a request for an IMEI of the second UE. After the server transmits the message to the second UE, it may receive a responsive message (e.g., a response to emergency attach initiation message) from the second UE. According to some embodiments, if the responsive message from the second UE does not include an IMEI value of the second UE, the network may reject the emergency attach request of the second UE.

Figure 8:
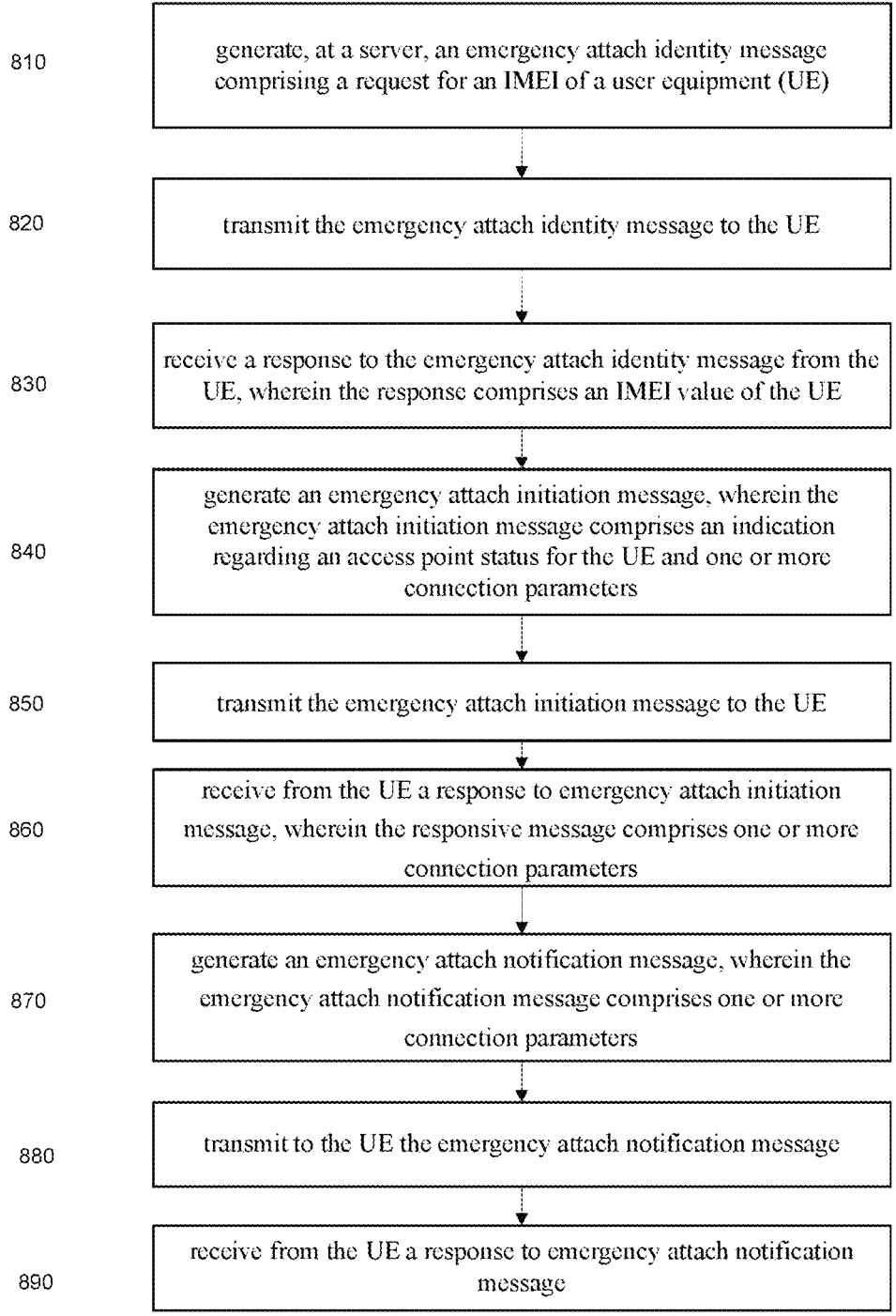
FIG. 8 is a flow chart illustrating a process according to some embodiments.

Referring now to FIG. 8, a process 800 for exchanging connection parameters between a server and UE is provided in accordance with some embodiments. The server may be, for example, a 3GPP AAA server. According to aspects of process 800, the exchange of identity information occurs separately from the exchange of connection parameters. For example, the IMEI may be exchanged before any exchange of connection parameters.

The process 800 may begin with step 810, which includes generating, at a server, an emergency attach identity message comprising a request for an IMEI of a UE. In step 820, the server transmits the emergency attach identity message to the UE. In step 830, the server receives a response to the emergency attach identity message from the UE, where the response comprises an IMEI value of the UE. In step 840, the server generates an emergency attach initiation message, where the emergency attach initiation message comprises an indication regarding an access point status for the UE and one or more connection parameters. In step 850, the server transmits the emergency attach initiation message to the UE. In step 860, the server receives from the UE a response to emergency attach initiation message, where the responsive message comprises one or more connection parameters. In step 870, the server generates an emergency attach notification message, where the emergency attach notification message comprises one or more connection parameters. In step 880, the server transmits to the UE the emergency attach notification message. In step 890, the server receives from the UE a response to emergency attach notification message.

Referring now to FIG. 9, a process 900 for exchanging connection parameters between a server and UE is provided in accordance with some embodiments. The server may be, for example, a 3GPP AAA server.

The process 900 may begin, for example, at step 910. In step 910, the UE sends to the server a first message indicating an emergency attach request. In some embodiments, the first message includes and IMSI or IMEI value of the UE. In certain aspects, the first message includes an IMSI that is not known to the server, or the first message indicates that the UE does not have a UICC. The first message may be, in some embodiments, a 3GPP EAP-Response/Identity message.

In step 920, the UE receives from the server a second message, such as an emergency attach initiation message. According to some embodiments, the second message (e.g., emergency attach initiation message) comprises one or more connection parameters. In certain aspects, the message received from the server includes an indication regarding an access point status for said UE, and may also indicate a request for an IMEI of the UE. In some embodiments, the indication is that the UE is attaching via a trusted non-3GPP WLAN. Additionally, the connection parameters can indicate network support for one or more connection modes (e.g., single or multi-connection mode).

In step 930, the UE generates a third message responsive to the second message (e.g., emergency attach initiation message), wherein the responsive message comprises one or more connection parameters. According to some embodiments, the connection parameters include one or more of information regarding a connection mode for said UE (e.g., regarding one of single-connection mode and multi-connection mode), requested PDN type (e.g., IPv4, IPv6, IPv4v6), and protocol configuration options. In some embodiments, the second message (e.g., emergency attach initiation message) indicates a request for an IMEI of the UE, and thus, the response to the second message comprises an IMEI value of the UE based on the request.

In step 940, the UE transmits the responsive, third message to the server. According to some embodiments, the transmission and reception of the connection parameters occurs without use of a shared key with respect to the UE. However, after completion of the steps of process 900, after the UE may exchange key information with the server.

In certain aspects, communications between the UE and server may be routed through one or more proxies and/or authenticators, in addition to the access network.

According to some embodiments, process 900 may further include the UE receiving another message, such as an emergency attach notification message, wherein the message comprises one or more connection parameters, and the UE transmitting another responsive message (e.g., a response to emergency attach notification message). In some embodiments, the connection parameters of the emergency attach notification message comprise one or more of PDN type supported in a PDN connection (e.g., IPv4, IPv6, IPv4v6), protocol configuration options, IPv4 address and/or IPv6 interface identifier, a trusted WLAN access gateway (TWAG) user plane MAC address, and said TWAG control plane MAC address(es).

Figure 10:
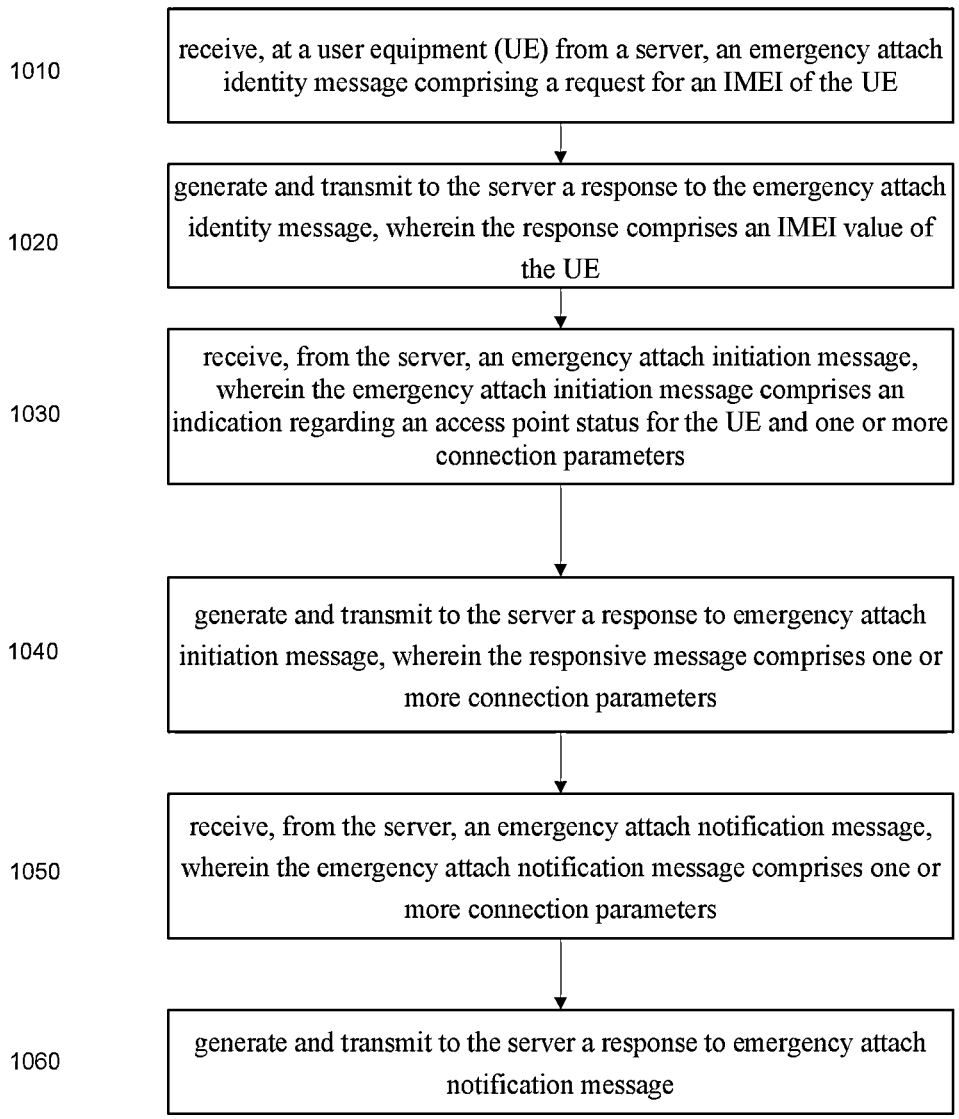
FIG. 10 is a flow chart illustrating a process according to some embodiments.

Referring now to FIG. 10, process 1000 for exchanging connection parameters between a server and UE is provided in accordance with some embodiments. The server may be, for example, a 3GPP AAA server. According to aspects of process 1000, the exchange of identity information occurs separately from the exchange of connection parameters. For example, the IMEI may be exchanged before any exchange of connection parameters The process 1000 may begin, for example, with step 1010. In step 1010, a UE receives from a server an emergency attach identity message comprising a request for an IMEI of the UE. In step 1020, and in response to the received identity message, the UE generates and transmits to the server a response to the emergency attach identity message. In some embodiments, the response comprises an IMEI value of the UE. In step 1030, the UE receives, from the server, an emergency attach initiation message. In some embodiments, the emergency attach initiation message comprises an indication regarding an access point status for the UE and one or more connection parameters. In step 1040, the UE generates and transmits to the server a response to emergency attach initiation message, wherein the response to initiation message comprises one or more connection parameters. In step 1050, the UE receives, from the server, an emergency attach notification message, wherein the emergency attach notification message comprises one or more connection parameters. In step 1060, the UE generates and transmits to the server a response to emergency notification message.

Figure 11:
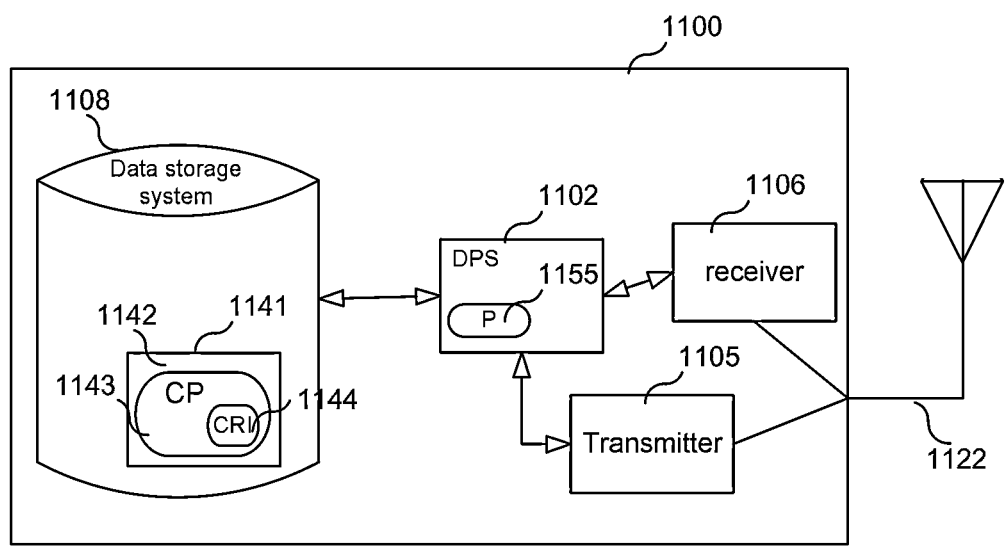
FIG. 11 is a block diagram of User Equipment (UE) according to some embodiments.

FIG. 11 is a block diagram of a UE 1100 according to some embodiments. As shown in FIG. 11, the UE may comprise: a data processing system (DPS) 1102, which may include one or more processors 1155 (e.g., a general purpose microprocessor and/or one or more other processors, such as an application specific integrated circuit (ASIC), field-programmable gate arrays (FPGAs), and the like); a radio transmitter 1105 and a radio receiver 1106 coupled to an antenna 1122 for use in wirelessly communicating with a radio access network (RAN) node, access network, authenticator, and/or server; and local storage unit (a.k.a., "data storage system") 1108, which may include one or more non-volatile storage devices and/or one or more volatile storage devices (e.g., random access memory (RAM)). In embodiments where the UE includes a general purpose microprocessor, a computer program product (CPP) 1141 may be provided. CPP 1141 includes a computer readable medium (CRM) 1142 storing a computer program (CP) 1143 comprising computer readable instructions (CRI) 1144. CRM 1142 may be a non-transitory computer readable medium, such as, but not limited to, magnetic media (e.g., a hard disk), optical media (e.g., a DVD), memory devices (e.g., random access memory), and the like. In some embodiments, the CRI 1144 of computer program 1143 is configured such that when executed by data processing system 1102, the CRI causes the UE to perform steps described above (e.g., steps described above with reference to the flow charts). In other embodiments, the UE may be configured to perform steps described herein without the need for code. That is, for example, data processing system 1102 may consist merely of one or more ASICs. Hence, the features of the embodiments described herein may be implemented in hardware and/or software.

Figure 12:
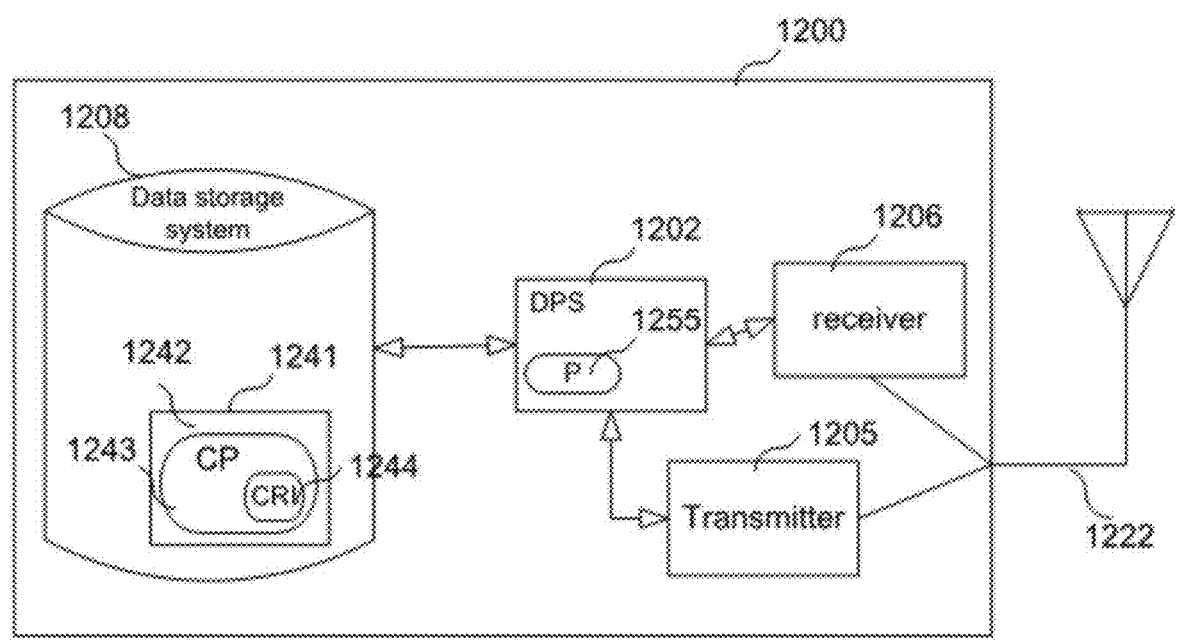
FIG. 12 is a block diagram of a server according to some embodiments.

FIG. 12 is a block diagram of a server 1200, such as a 3GPP AAA server module, according to some embodiments. As shown in FIG. 12, the server may comprise: a data processing system (DPS) 1202, which may include one or more processors 1255 (e.g., a general purpose microprocessor and/or one or more other processors, such as an application specific integrated circuit (ASIC), field-programmable gate arrays (FPGAs), and the like); a radio transmitter 1205 and a radio receiver 1206 coupled to an antenna 1222. These may be for use in communicating with a UE, authenticator, proxies, or other servers; and local storage unit (a.k.a., "data storage system") 1208, which may include one or more non-volatile storage devices and/or one or more volatile storage devices (e.g., random access memory (RAM)). In embodiments where the server includes a general purpose microprocessor, a computer program product (CPP) 1241 may be provided. CPP 1241 includes a computer readable medium (CRM) 1242 storing a computer program (CP) 1243 comprising computer readable instructions (CRI) 1244. CRM 1242 may be a non-transitory computer readable medium, such as, but not limited, to magnetic media (e.g., a hard disk), optical media (e.g., a DVD), memory devices (e.g., random access memory), and the like. In some embodiments, the CRI 1244 of computer program 1243 is configured such that when executed by data processing system 1202, the CRI causes the server to perform steps described above (e.g., steps described above with reference to the flow charts). In other embodiments, the server may be configured to perform steps described herein without the need for code. That is, for example, data processing system 1202 may consist merely of one or more ASICs. Hence, the features of the embodiments described herein may be implemented in hardware and/or software.

Figure 13:
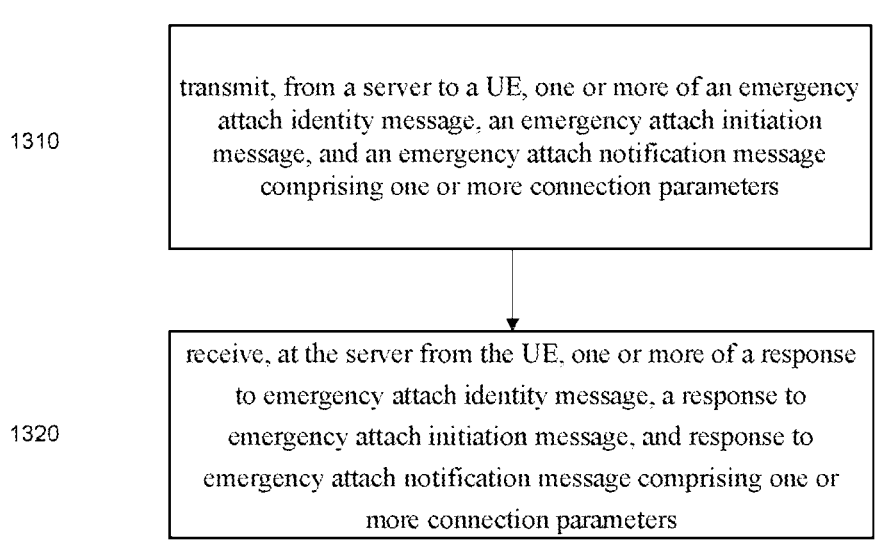
FIG. 13 is a flow chart illustrating a process according to some embodiments.
Figure 14:
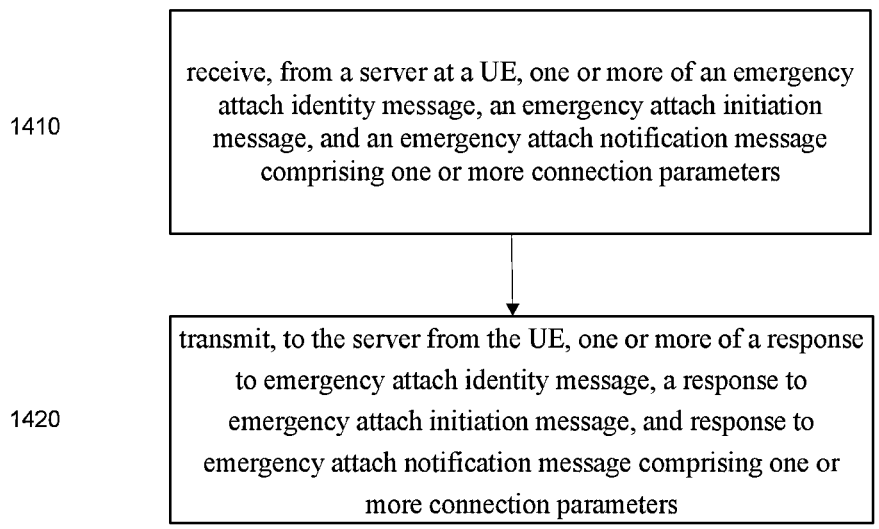
FIG. 14 is a flow chart illustrating a process according to some embodiments.

Referring now to FIG. 13 and FIG. 14, processes 1300 and 1400 are provided for exchanging messages between a UE 1100 and server 1200 in accordance with some embodiments. Step 1310 includes transmitting, from the server to the UE, one or more of an emergency attach identity message, an emergency attach initiation message, and an emergency attach notification message comprising one or more connection parameters. In step 1320, the server receives from the UE one or more of a response to emergency attach identity message, a response to emergency attach initiation message, and response to emergency attach notification message comprising one or more connection parameters. Conversely, in step 1410, the UE receives from a server one or more of an emergency attach identity message, an emergency attach initiation message, and an emergency attach notification message comprising one or more connection parameters. In step 1420, the UE transmits to the server one or more of a response to emergency attach identity message, a response to emergency attach initiation message, and response to emergency attach notification message comprising one or more connection parameters.

Provisional Application U.S. No. 62/451,883 filed on Jan. 30, 2017, and titled "Method and Devices for Parameter Exchange During Emergency Access" is hereby incorporated by reference in its entirety. This includes Appendix A, Appendix B, and Appendix C to U.S. No. 62/451,883, and any connection parameters identified therein. Further, all 3GPP technical specification sections identified in this disclosure with a "TS" designation are hereby incorporated by reference as well.

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method comprising:
sending, to a server from a user equipment (UE), a first message indicating an emergency attach request;
the UE receiving a second message from the server in response to the first message,
wherein said second message comprises one or more connection parameters and said sending and receiving is enabled without mutual authentication between the server and the UE, and
wherein said second message is an Extensible Authentication Protocol (EAP) emergency attach initiation message and comprises an indication regarding an access point status for said UE, and the connection parameters indicate support for one or more connection modes;
the UE generating a third message, wherein said third message comprises one or more connection parameters; and
the UE transmitting said third message to the server, wherein said third message is an EAP response to emergency attach initiation message and said connection parameters comprises information regarding a connection mode for said UE.

2. The method of claim 1, wherein said first message is an EAP responsive identity request message.

3. The method of claim 2, wherein said first message comprises an IMSI that is not known to said server, or said identity message indicates that said UE does not include a UICC.

4. The method of claim 3, wherein said second message indicates a request for an IMEI of said UE and said third message comprises an IMEI value of said UE based on said request.

5. The method of claim 1, wherein said information comprises information regarding one of single-connection mode and multi-connection mode, requested PDN type, and protocol configuration options.

6. The method of claim 1, wherein the server is a 3GPP Authentication, Authorization and Accounting (AAA) protocol server.

7. The method of claim 1, wherein said indication regarding an access point status for said UE indicates that said UE is accessing a network via a trusted Wireless LAN access point.

8. The method of claim 1, wherein said first message comprises an IMSI or IMEI value of said UE.

9. The method of claim 1, wherein said transmission and reception of connection parameters occurs without use of a shared key with respect to said UE.

10. The method of claim 1, wherein receiving one or more messages comprises:
the UE receiving at least one message from an authenticator in communication with said server and said UE, wherein said authenticator is configured to forward said at least one message to said UE.

11. The method of claim 1, further comprising:
after performing said transmitting and receiving steps, exchanging key information with said server.

12. The method of claim 1, wherein said messages are identifiable by one or more specific values in a Vendor-Type field of an EAP message header.

13. The method of claim 1, wherein said messages share one value in a Vendor-Type field of an EAP message header of the Expanded method and are identifiable in a sub-field in the Vendor data field of the EAP message header.

14. A user equipment (UE) configured to:
send, to a server, a first message indicating an emergency attach request;
receive a second message from the server in response to the first message, said second message comprises one or more connection parameters wherein said messages are Extensible Authentication Protocol (EAP) messages and said server and said UE are not mutually authenticated, and wherein said first message is an EAP responsive identity request message and wherein said second message is an EAP emergency attach initiation message that comprises an indication regarding an access point status for said UE, and the connection parameters indicate support for one or more connection modes;
generate a third message, wherein said third message comprises one or more connection parameters; and
transmit said third message to the server, wherein said third message is an EAP response to emergency attach initiation message and said connection parameters comprises information regarding a connection mode for said UE.

15. A method comprising:
sending, to a server from a user equipment (UE), a first message indicating an emergency attach request;
the UE receiving a second message from the server in response to the first message,
wherein said second message comprises one or more connection parameters and said sending and receiving is enabled without mutual authentication between the server and the UE, and wherein said second message is an Extensible Authentication Protocol (EAP) emergency attach initiation message and comprises an indication regarding an access point status for said UE, and the connection parameters indicate support for one or more connection modes;
the UE generating a third message, wherein said third message comprises one or more connection parameters;
the UE transmitting said third message to the server;
the UE receiving a fourth message from the server, wherein said fourth message comprises one or more connection parameters; and
the UE transmitting a fifth message to the server that is responsive to said fourth message.

16. The method of claim 15, wherein said connection parameters of the fourth message comprise one or more of PDN type supported in a PDN connection, protocol configuration options, IPv4 address and/or IPV6 interface identifier, a trusted WLAN access gateway (TWAG) user plane MAC address, and said TWAG control plane MAC address(es).

* * * * *